US008010393B1

(12) United States Patent
Pierce

(10) Patent No.: US 8,010,393 B1
(45) Date of Patent: Aug. 30, 2011

(54) EVENT-LINKED CREDIT PROTECTION STRUCTURE

(75) Inventor: Kenneth R. Pierce, Port Washington, NY (US)

(73) Assignee: Morgan Stanley, New York, NY (US)

( * ) Notice: Subject to any disclaimer, the term of this patent is extended or adjusted under 35 U.S.C. 154(b) by 596 days.

(21) Appl. No.: 12/008,444

(22) Filed: Jan. 11, 2008

(51) Int. Cl.
*G06Q 40/00* (2006.01)
(52) U.S. Cl. .......................................................... 705/4
(58) Field of Classification Search ........................ 705/4
See application file for complete search history.

(56) References Cited

U.S. PATENT DOCUMENTS

| | | | | |
|---|---|---|---|---|
| 7,359,863 | B1* | 4/2008 | Evenshaug et al. | 705/4 |
| 2003/0135395 | A1* | 7/2003 | Carfi et al. | 705/4 |
| 2006/0218019 | A1* | 9/2006 | Reis | 705/4 |
| 2006/0242052 | A1* | 10/2006 | Long et al. | 705/35 |
| 2007/0005401 | A1* | 1/2007 | Vinyard | 705/4 |
| 2008/0077448 | A1* | 3/2008 | Diamond | 705/4 |
| 2008/0288295 | A1* | 11/2008 | Caballero et al. | 705/4 |

OTHER PUBLICATIONS

Plantain, Guillaume, "Does Reinsurance Need Reinsurese?" The Journal of Risk and Insurance, 2006, vol. 73, No. 1, pp. 153-168.*

* cited by examiner

*Primary Examiner* — Charles R Kyle
*Assistant Examiner* — Asha Puttaiah
(74) *Attorney, Agent, or Firm* — K&L Gates LLP

(57) ABSTRACT

A process that provides protection to an entity against the risk that a third party experiences a credit-related problem as a result of, or following a fortuitous, identifiable, insurable event, where the entity is exposed to the credit risk of the third party. The process may comprise the step of entering into, by the entity, an insurance agreement with an insurer, wherein the obligations of the insurer under the insurance agreement are triggered upon the occurrence of both (1) a credit-related problem of the third party and (2) the event. The entity may be, for example, a person or a business. Where the entity is an insurance provider, the insurer may be a reinsurer, and the insurance agreement between the two may be a reinsurance agreement. The credit-related problem of the third party may be a solvency problem or a failure to borrow a certain amount of money on the part of the third party. The failure to borrow may arise out of a failure to obtain a loan on the part of the third party or a failure to raise by the third party the certain amount of money through the issuance of debt or equity securities.

7 Claims, 6 Drawing Sheets

EVENT-LINKED CREDIT PROTECTION STRUCTURE

BACKGROUND

The present invention is related to event-linked protection products and structures, and credit-linked protection products and structures.

Event-linked protection products and structures, such as insurance, indemnify an entity or a person for loss resulting from fortuitous, identifiable, insurable events. Credit-linked protection products and structures are transaction structures designed to protect a party from loss as a result of its exposure to another party's credit.

As noted, event-linked protection products and structures include insurance. For example, homeowner's insurance can protect a homeowner from losses due to perils such as fires, hurricanes, earthquakes, floods, etc. Health insurance can protect an individual against financial losses occurring because of health issues. Life insurance allows a policyholder to protect his or her designated beneficiary(ies) in the case of the insured's death.

There are, of course, many other types of insurance and reinsurance. One type of reinsurance is a government-administered catastrophe funds. FIG. 1 is a diagram of how such a government-administered catastrophe fund may operate, in this case, the Florida Hurricane Catastrophe Fund (FHCF). As shown in FIG. 1, the Participating Insurer issues a number of residential insurance policies to residential property owners, for which the property owners pay their insurance premiums to the Participating Insurer. The government-administered catastrophe fund, in this case, the FHCF, agrees to reimburse the Participating Insurer in exchange for premiums paid by the Participating Insurer to the fund. In the case of the FHCF, the premiums are actuarially determined based on the exposure profiles of the participating insurance policies with the homeowners. Both the retention amount and the maximum coverage limit for the reimbursement provided by the FHCF are proportionally related to the premiums.

If the cash balance in the fund is insufficient to pay the claims arising from a hurricane, the FHCF is authorized to raise funds for the reimbursement payments by issuing revenue bonds. To cover the debt service on the issued revenue bonds, the FHCF is authorized to impose an emergency assessment on most property and casualty insurance revenues in the state. Debt service on the revenue bonds is also covered through yearly reimbursement premiums collected from the Participating Insurers.

Credit-linked products and structures protect an entity or person (the Protection Buyer) from the credit exposure the entity may have to a third party (the Reference Entity). Credit protection can come in many forms, but certain forms of credit protection are generally not regarded, legally or for accounting purposes, as insurance. One such form of credit protection that is not considered insurance is a credit default swap (CDS). A CDS is a bilateral derivative contract under which two counterparties agree to isolate and separately trade the credit risk of at least one third-party Reference Entity, typically in connection with an identified traded obligation of such entity (the Reference Obligation). Under a CDS, a Protection Buyer pays a periodic fee to a Protection Seller in exchange for a contingent payment by the Protection Seller upon a defined event happening in connection with the Reference Obligation. When a credit event is triggered, the Protection Seller makes the contingent payment to the Protection Buyer and either takes delivery of the Reference Obligation or sets off against its payment an agreed value for the Reference Obligation. Unlike insurance, there is no requirement in the CDS market for the counterparties to actually hold the Reference Obligation at the time that the credit event occurs.

Certain types of credit-linked protection are considered insurance for legal and accounting purposes. One such type of credit protection is a surety bond. Surety bonds are trilateral contracts in which one party, the Surety, agrees to uphold—for the benefit of the second party, the Obligee—the contractual promises (obligations) made by the third party, the Principal, if the principal fails to uphold its promises to the Obligee. Such contracts are typically formed so as to induce the Obligee to contract with the Principal, i.e., to demonstrate the credibility of the Principal and guarantee performance and completion per the terms of the agreement.

Another type of credit-linked protection that is considered insurance is a financial guarantee. In a financial guarantee, the insurer agrees to indemnify a party against loss resulting from a third party's default under specifically identified loans or other obligations.

Another type of credit-linked protection that is not considered insurance is a letter of credit. In a letter of credit, a party (the Applicant) arranges for the writer or issuer, typically a bank, to issue a letter of credit to a beneficiary, under which the writer or issuer agrees to make payment to the beneficiary, either on a conditional or unconditional basis, upon demand.

As noted above, CDS is not considered insurance for legal and accounting purposes. Surety bonds and financial guarantee policies are considered insurance, but in both types of arrangements, the insurer has recourse to the party whose credit is subject to protection (the Principal in the case of a surety bond, and the debtor in the case of a financial guarantee) for repayment of the amounts paid to the obligee or insured. Similarly, in a letter of credit, the writer or issuer has recourse to the Applicant (or another third party such as a guarantor) through a reimbursement arrangement which is triggered upon draw down by the beneficiary.

Event-linked protection, usually in the form of insurance, has historically been considered distinct from credit-linked protection, usually transacted in the capital markets. The inventor has created a product that combines features of both of these products and market segments into a single product.

Until the present invention, the inventor was not aware of any event-linked credit protection product, especially one that qualified as insurance for legal, regulatory, and accounting purposes (or as reinsurance if the party obtaining the product is an insurance provider), which (a) makes an indemnity payment for actual loss incurred following both an insurable, fortuitous peril (such as a hurricane) and a credit event (such as the failure to pay on an obligation); and (b) does not involve recourse or reimbursement from the party whose credit is subject to protection, or a guarantor. For example, currently an entity can buy insurance that protects against losses resulting from an insured-against event, but there is no known product that allows an entity to buy protection that a particular third party will experience a credit event in conjunction with the insured-against event. Similarly, an entity can buy, through the CDS markets, protection against a credit event involving a Reference Party and Reference Obligation, but this type of derivative product does not protect against the credit event occurring because of a particular insurable event such a hurricane, tornado, fire or other fortuitous, insurable peril.

SUMMARY

In one general aspect, the present invention is directed to a process that provides protection to an entity against the risk that a third party experiences a credit-related problem as a result of, or following a fortuitous, identifiable, insurable event, where the entity is exposed to the credit risk of the third party. According to various embodiments, the process comprises the step of entering into, by the entity, an insurance agreement with an insurer, wherein the obligations of the insurer under the insurance agreement are triggered upon the occurrence of both (1) a credit-related problem of the third party and (2) an event. The entity may be, form example, a person or a business. The fortuitous, identifiable, insurable event may be a catastrophic event such as a hurricane, an earthquake, a fire, a flood, or another insurance casualty event such as the risk of a product recall, a claim under a product warranty, or legal liability for negligence, errors or omissions. The credit-related problem of the third party may be a solvency problem or a failure on the part of the third party to borrow a certain amount of money necessary to make payments owed on its outstanding obligations. The failure to borrow may arise out of a failure to obtain a loan on the part of the third party, or a failure by the third party to raise the required amount of money through the issuance of debt or equity securities (e.g., bonds or stock). In certain embodiments, the entity obtaining the event-linked protection may be an insurance provider, in which case the insurance agreement may be a reinsurance agreement with a Reinsurer, where the obligations of the Reinsurer under the reinsurance agreement are triggered upon the occurrence of both (1) a credit-related problem of the third party and (2) an event.

According to various implementations, the third party or Reference Entity may be a manufacturer, contractor or other entity or business, or a government-sponsored reimbursement program or fund, like the FHCF or any other similar fund, that is designed to reimburse Participating Insurers, within certain limits, for payments made by the Participating Insurers in the form of benefits paid to policyholders of the Participating Insurers following a catastrophic event, such as a hurricane, earthquake, or flood. Where such funds raise reimbursement proceeds following a catastrophic event through an offering of securities or other obligations, the Participating Insurers face the risk that the fund may not be able to raise sufficient money to cover the benefit payments made by the Participating Insurer in a sufficiently timely manner. Combined event/credit protection structures, according to embodiments of the present invention, can mitigate this risk.

According to various embodiments, following a qualifying catastrophic event that requires the Participating Insurer to pay benefits to its policyholders, the Participating Insurer may make a request for reimbursement to the government-administered catastrophe fund. If, at the end of a specified period of time (such as thirty, sixty, or ninety days after the request for reimbursement, or some other period of time), the Participating Insurer has not been fully reimbursed by the fund, the Participating Insurer may make a claim to the Reinsurer for the recovery shortfall amount, which is an amount equal to the difference between the reimbursement amount that the Participating Insurer was supposed to receive from the fund and the amount that the insurer actually received as of the specified date.

In some scenarios, the money paid by the third party (such as where the third party is a government administered fund) may not be assignable to the insurer (or Reinsurer, as the case may be) without the approval of the relevant government authority. In that case, according to various embodiments, the entity and the insurer may seek and obtain such governmental approval and thereafter enter into an assignment or pledge agreement whereby the entity assigns or pledges its rights to any future funds paid by the fund to the entity, after the insurer makes the recovery shortfall payment to the entity. Further, the entity and the insurer may enter into an account control agreement that governs control of the bank account into which the fund deposits the reimbursement payments. According to various embodiments, the bank account into which the reimbursement proceeds from the fund are deposited may be owned by the entity. When the insurer makes a recovery shortfall payment to the entity, the insurer may send notice to the bank exercising its right to the money in the account and effectively cutting off the entity's rights to the moeny (in whole or in part) from that point. Once, and if, the recovery shortfall amount has been fully reimbursed to the insurer, the insurer may release its control of the bank account. As mentioned above, the entity obtaining the event-linked credit protection may be an insurance provider (e.g., a Participating Insurer), in which case the insurance provider may enter into the assignment or pledge agreement with a Reinsurer.

In another general aspect, the present invention is directed to a process for providing event-linked credit protection to a Protection Buyer (e.g., a policyholder). The process may comprise the steps of: (1) procuring, by the Protection Buyer, one or more primary insurance policies from one or more primary insurers to cover a defined insurable event up to a coverage limit; and (2) procuring, by the Protection Buyer, a secondary insurance policy from a secondary insurer that covers the event up to the coverage limit. The secondary insurance policy may provide that: (1) all recoverables received by the protection buyer under the one or more primary insurance policies reduce, dollar for dollar, the coverage limit afforded to the Protection Buyer under the secondary insurance policy; (2) payment is made to the Protection Buyer by the secondary insurer under the secondary insurance policy upon the failure of any of the one or more primary insurers to pay within a specified period of time after a claim is submitted by the Protection Buyer; and (3) upon paying the claim, the secondary insurer is assigned by the Protection Buyer rights to recover against the one or more primary insurers that failed to pay within the specified period of time. According to various embodiments, the secondary insurance policy qualifies as insurance for legal, regulatory, and accounting purposes. Again, in certain embodiments, the Protection Buyer may be an insurance provider, in which case the secondary insurance may be reinsurance procured from a reinsurer (acting as the secondary insurer). The reinsurance may qualify as reinsurance for legal, regulatory, and accounting purposes.

These and other advantages of the present invention will be apparent from the description to follow.

FIGURES

Various embodiments of the present invention are described herein by way of example in conjunction with the following figures, wherein.

DETAILED DESCRIPTION

Figure 1:
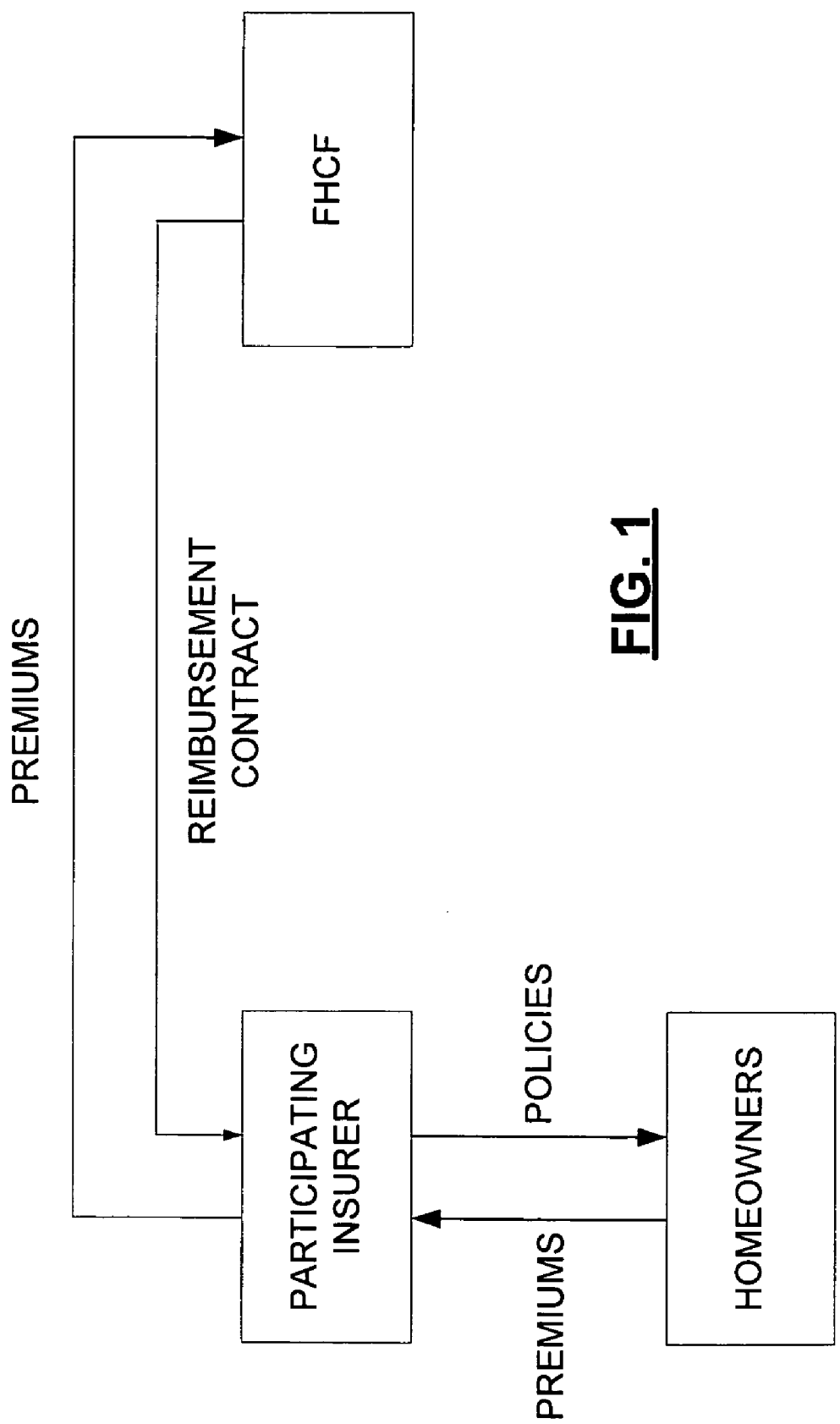
FIG. 1 is a diagram of how the FHCF works.
Figure 2:
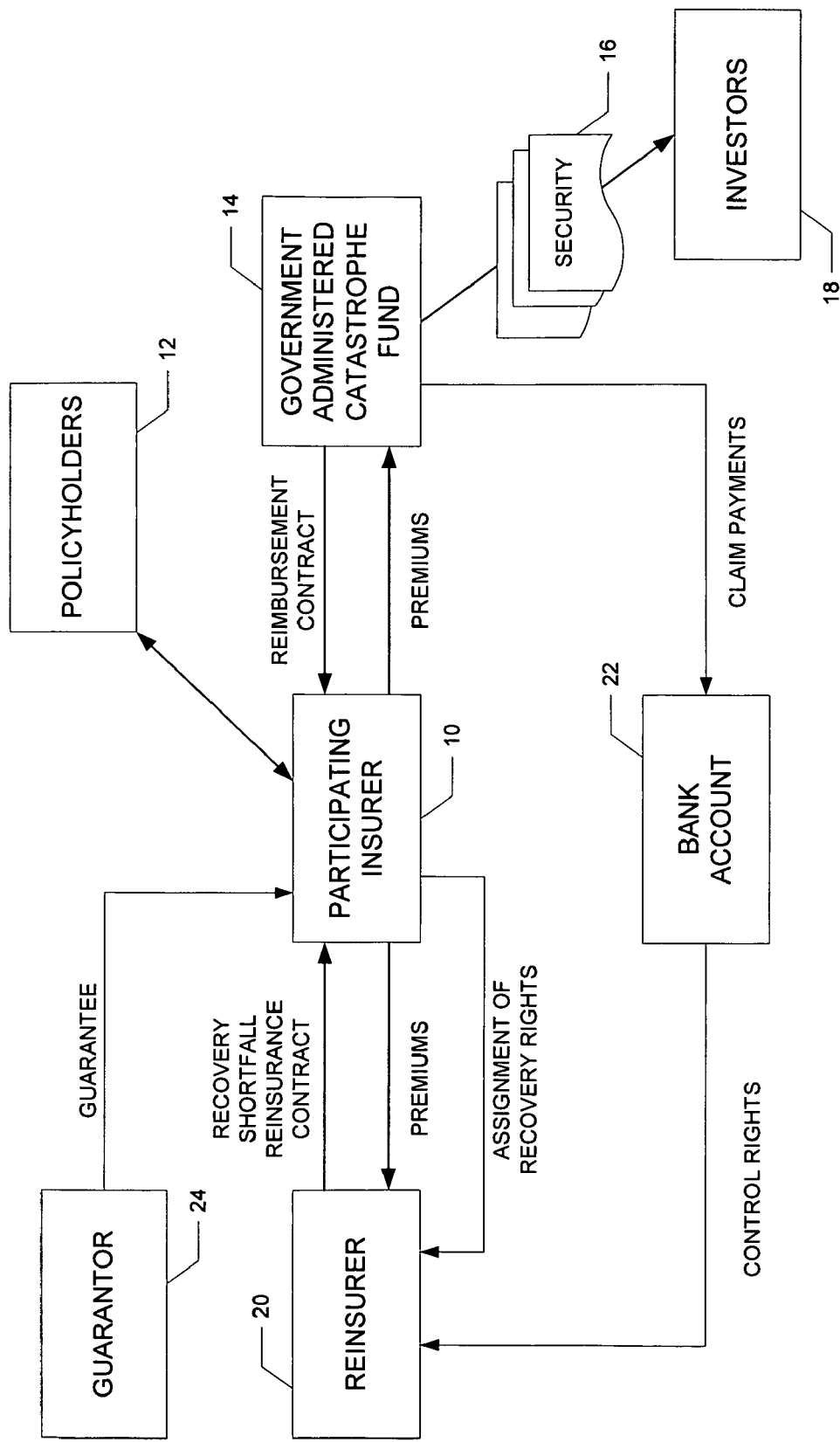
FIG. 2 is a diagram of a transaction structure according to various embodiments of the present invention.

FIG. 2 is a diagram of a transaction structure according to various embodiments of the present invention. The illustrated transaction structure includes a Participating Insurer 10, which may be an insurance company that provides residential or other types of property insurance to policyholders 12. The insurance may insure the policyholders 12 against losses occurring to the policyholders' homes, property, and/or contents thereof due to damage, as well as against other losses, as is well known in the insurance field.

In the illustrated transaction, the Participating Insurer 10 enters into a reimbursement agreement with a reimbursement agreement counterparty, in this case, a government-administered catastrophe fund 14, such as the FHCF. Pursuant to the reimbursement contract, the Participating Insurer 10 makes periodic premium payments to the fund 14, and in return the fund 14 agrees to reimburse, subject to certain qualifications, the Participating Insurer 10 for benefit payments made by the Participating Insurer 10 to its policyholders 12 following a catastrophic event, such as a catastrophic hurricane, flood, or earthquake.

The premiums paid by the Participating Insurer 10 to the fund 14 pursuant to the reimbursement agreement may be actuarially determined based on the Participating Insurer's 10 exposure profile. For example, a Participating Insurer 10 whose portfolio of policies exposes is weighted toward inland properties may have a lower exposure profile, and consequently pay a lower premium, than a Participating Insurer 10 whose portfolio is weighted toward coastal properties. In a related manner, the amount of the reimbursement to be paid by the fund 14 in the wake of a qualifying catastrophic event may be subject to retention and maximum coverage limits that are proportionally related to the premiums. That is, the retention limit may be x times the premium and the maximum coverage limit may be y times the premium. In 2006, for the FHCF, x equaled 5.27 and y equaled 14.04. Thus, in such an embodiment, the Participating Insurer 10 would only be eligible for reimbursement following a qualifying catastrophic event if the benefit payments made by the Participating Insurer 10 to its policyholders 12 due to damage caused by the catastrophic event are greater than the retention amount, and the reimbursement would be capped at the maximum coverage limit.

Although only one Participating Insurer 10 is shown in FIG. 2, it should be recognized that the fund 14 may enter into reimbursement agreements with a number of Participating Insurers. In fact, by law all insurers of residential property owners in the jurisdiction (e.g., state) may be required to purchase a certain level of reimbursement coverage (e.g., 45%, 75%, or 90% coverage) from the fund 14.

According to various embodiments, following a qualifying catastrophic event that triggers the fund's reimbursement obligations, the fund 14 may issue financial securities (or other obligations) 16 to investors 18 in an offering to raise the money to pay the reimbursement payments to Participating Insurers 10 if the cash balance of the fund 14 is insufficient to pay the claims. The securities (or other obligations) 16 are preferably debt instruments, such as bonds. In particular, the securities (or other obligations) 16 may be revenue bonds where the principal and interest payments on the bonds are backed by the fund's ability to impose an assessment on all insurance revenues in its jurisdiction, such as is the case with the FHCF. In other embodiments, revenue bonds may be backed by some other source of revenue available to the fund 14.

The present inventor has recognized that some insurers participating in such catastrophic event reimbursement programs may wish to obtain event-linked credit protection to minimize their credit exposure to such a government-administered catastrophe fund, and, in that connection, have developed novel structures for providing such credit protection. Further, event-linked credit protection can qualify as insurance (or reinsurance, as the case may be) for legal, regulatory, and accounting purposes (e.g., FAS 113 and 133).

Various aspects of the novel event-linked credit protection structures are shown in the transaction structure of FIG. 2. According to various embodiments, the Participating Insurer 10 may enter into a recovery shortfall reinsurance agreement with a Reinsurer 20. (A reinsurer is an insurer who provides insurance to an insurance provider, such as Participating Insurer 10.) Pursuant to the recovery shortfall reinsurance agreement, when the Participating Insurer 10 submits a request for reimbursement to the fund 14 following a qualifying catastrophic event, the Reinsurer 20 agrees to pay the Participating Insurer 10 an amount equal to the Participating Insurer's unrecovered reimbursement amount as of a certain date, such as thirty to ninety days following the date on which the Participating Insurer 10 submitted a request for reimbursement. That is, the Reinsurer 20, in exchange for recovery shortfall reinsurance premium payments from the Participating Insurer 10, agrees to make up the difference between the amount of reimbursement requested by the Participating Insurer 10 from the fund 14 pursuant to the reimbursement coverage and the amount the Participating Insurer 10 has actually recovered from the fund 14 as of the specified date (i.e., the recovery shortfall). So, for example, if following a qualifying catastrophic event the Participating Insurer 10 is entitled to receive $10 million from the fund 14 under the reimbursement coverage (subject to a threshold and maximum coverage limits), and if the fund 14 has only reimbursed the insurer $7 million as of the specified date (e.g., sixty days after submission for reimbursement by the insurer 10), the Reinsurer 20 would pay the Participating Insurer 10 the recovery shortfall, or $3 million in this example.

In some scenarios, the money paid by the fund 14 may not be assignable to the Reinsurer 20 (i.e., they are non-assignable reinsurance recoverables). According to various embodiments, therefore, the reimbursement proceeds from the fund 14 are deposited into a bank account 22 owned by the Participating Insurer 10. The Participating Insurer 10 and Reinsurer 20 may enter into an assignment or pledge agreement whereby the Participating Insurer 10 assigns or pledges its rights to funds deposited in the bank account 22 to the Reinsurer 20, which is triggered when the Reinsurer 20 makes a recovery shortfall payment to the Participating Insurer 10 and which remains in force until the Reinsurer 20 is reimbursed for the recovery shortfall payment. Thus, using the above example, after the Reinsurer 20 makes the $3 million recovery shortfall payment to the Participating Insurer 10, the Reinsurer 20 would be entitled to the next $3 million deposited in the bank account 22 by the fund 14. The Reinsurer 20 may also have the pledge agreement filed with any appropriate or relevant agency(ies) to perfect the Reinsurer's 20 interest in the funds in the account 22.

The Participating Insurer 10 and the Reinsurer 20, and possibly even the bank administering the bank account 22 also may enter into an account control agreement which governs control of the account 22. According to various embodiments, pursuant to the account control agreement, when the Reinsurer 20 makes a recovery shortfall payment to the Participating Insurer 10, the Reinsurer 20 may send a notice to the bank that activates the Reinsurer's rights to the funds in the account 22 (pursuant to the pledge agreement), up to the amount of the recovery shortfall payment, and effectively cuts off the Participating Insurer's 10 interest in the funds of the account 22 until the Reinsurer's 20 interests are extinguished. When (and if) the Reinsurer 20 is reimbursed the recovery shortfall payment amount, the Reinsurer 20 may release its control of the account 22, pursuant to the account control agreement.

According to various embodiments, the government agency administering the fund 14 may be requested to approve the assignability of the reimbursement claims to the Reinsurer 20 under the pledge agreement. In addition, the government agency may also deem the agreement between the Reinsurer 20 and Participating Insurer 10 a reinsurance agreement for regulatory purposes.

Figure 3:
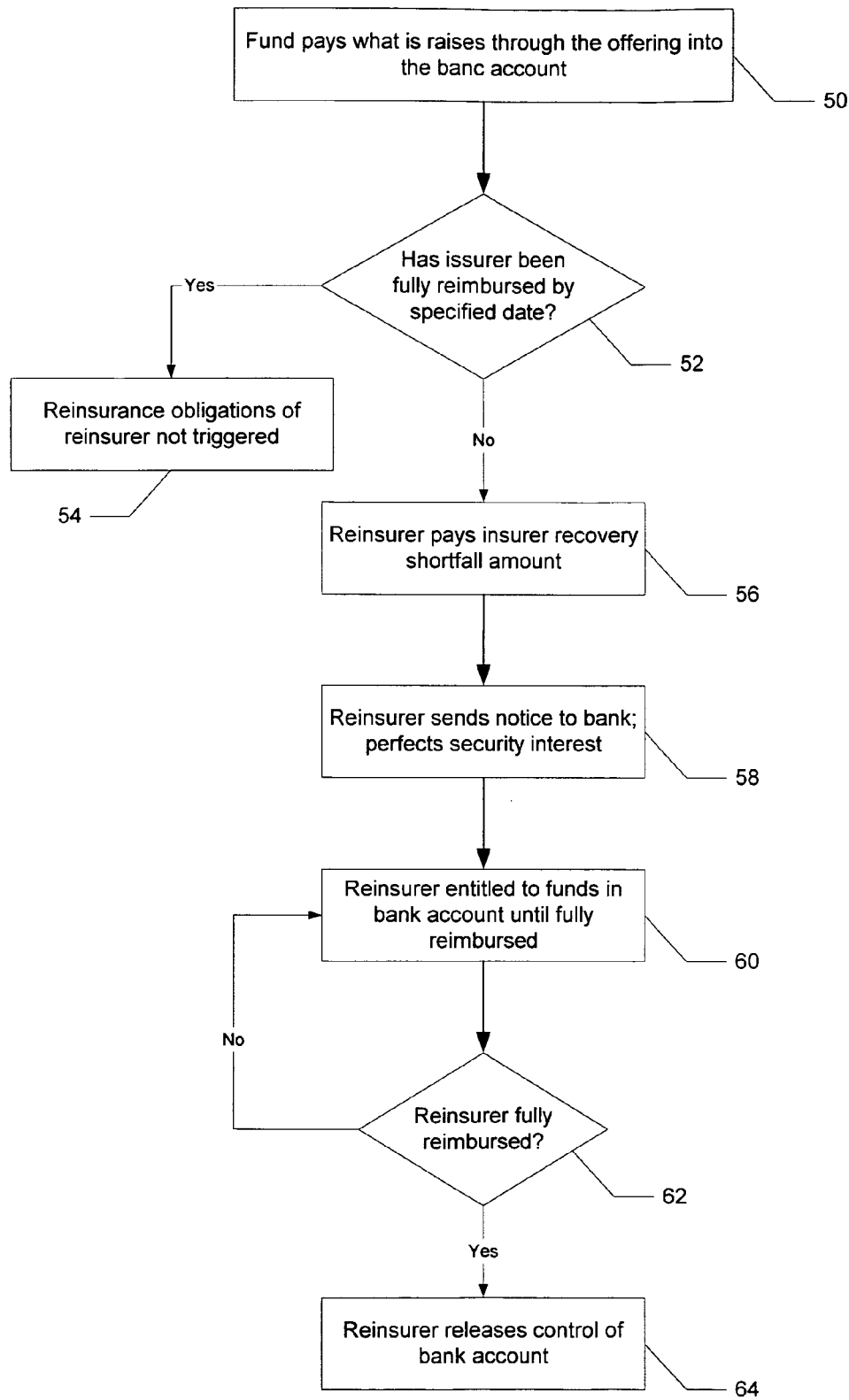
FIG. 3 is a flowchart diagram of a process according to various embodiments of the present invention.

FIG. 3 is a flowchart of how the process may work according to various embodiments. At step 50, following a qualifying catastrophic event and a reimbursement submission by the Participating Insurer 10 for reimbursement for benefits paid to its policyholders due to damage resulting from the catastrophic event, the fund 14 deposits proceeds from its revenue bond offering into the bank account 22 (owned by the Participating Insurer 10). On the specified date (e.g., sixty days after the Participating Insurer's 10 reimbursement submission), at step 52 it is determined whether the Participating Insurer 10 has been fully reimbursed by the fund 14 for the amount it is entitled to be reimbursed. If the Participating Insurer 10 has been fully reimbursed, the reinsurance obligations of the Reinsurer 20 are not triggered (step 54).

On the other hand, if the Participating Insurer 10 has not been fully reimbursed as of the specified date, the Reinsurer 20 makes the recovery shortfall payment to the Participating Insurer 10 at step 56. The recovery shortfall payment amount, as explained above, may be an amount equal to the Participating Insurer's 10 unrecovered reimbursement claim to the fund 14 as of the specified date. At step 58, at or around the time that the Reinsurer 20 makes the recovery shortfall payment to the Participating Insurer 10, the Reinsurer 20 may send a notice to the bank pursuant to the account control agreement to exercise the Reinsurer's right to the funds deposited in the account 22 by the fund 14, if any, after the specified date, up to the amount of the recovery shortfall payment. The Reinsurer 20 may also file the pledge agreement with any appropriate or relevant agency(ies) to perfect its interest in the account 22.

Thereafter, at step 60, the Reinsurer 20 is entitled to the funds deposited in the account 22 by the fund 14 until, at step 62, the recovery shortfall payment amount has been fully repaid to the Reinsurer 20. Once fully repaid, at step 64, the Reinsurer 20 may send a notice to the bank releasing the Reinsurer's 20 control of the account 22 (unless or until the Reinsurer's 20 obligations are triggered again by another catastrophic event).

Referring back to FIG. 2, according to various embodiments, a guarantor 24 may guarantee the performance of the Reinsurer's 20 reinsurance obligations to the Participating Insurer 10. Also, the Reinsurer 20 may hedge its credit exposure to the fund 14 through one or more hedging arrangements with hedge counterparties (not shown).

Figure 6:
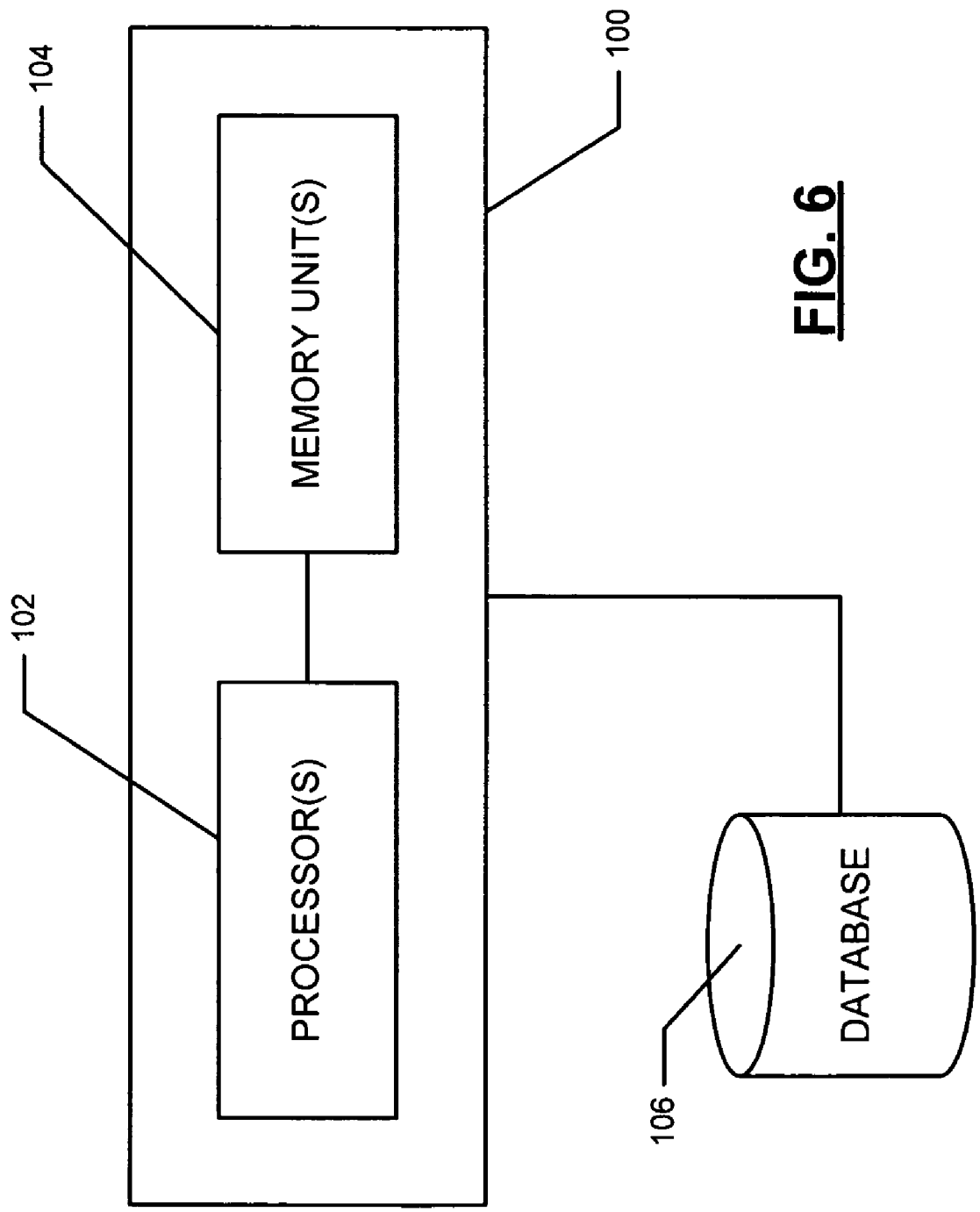
FIG. 6 is a simplified diagram of a computer system according to various embodiments of the present invention.

According to various embodiments, a programmed computer system, as shown in FIG. 6, may compute the amount of the recovery shortfall payment to be paid by the Reinsurer 20 to the Participating Insurer 10 based on the amount received by the Participating Insurer 10 from the fund 14 and based on the benefits paid by the Participating Insurer 10 following the catastrophic event. In addition, a computer system may be used to compute the premiums paid by the Participating Insurer 10 to the Reinsurer 20 for the reinsurance.

As shown in FIG. 6, the computer system may comprise one or more networked computing devices 100. The computing device 100 may be, for example, a server or a mainframe, or any other suitable computer device. The computing device 100 may comprise one or more processors 102 and one or more memory units 104. The memory unit(s) 104 may store computer instruction code or software that, when executed by the processor(s) 102 cause the processor(s) 102 to calculate the recovery shortfall amount and/or the premium amounts based on data stored in one or more databases 106. The processor(s) 102 may be a single or multiple core processor(s). The memory unit(s) 104 may comprise any suitable computer readable medium, such as RAM or ROM. The database(s) 106 may store data pertaining to the Participating Insurer's insurance policies. It may also store data regarding payments made by the fund, which may be used to compute the recovery shortfall payment amount. The computer system 100 may receive such data as feeds from data sources (not shown).

Although the above embodiments were described in the context of a catastrophe fund, it should be recognized that embodiments of the present invention may be extended to other contexts where the insurance obligations of a party (whether a primary insurer or reinsurer) are triggered by a failure or inability of another party to raise sufficient funding through an offering of securities or other obligations. More generally, according to various embodiments, the present invention is directed to a process that provides protection to an entity against the risk that a third party experiences a credit-related problem as a result of, or following a fortuitous, identifiable, insurable event, where the entity is exposed to the credit risk of the third party. According to various embodiments, the process comprises the step of entering into, by the entity, an insurance agreement with an insurer, wherein the obligations of the insurer under the insurance agreement are triggered upon the occurrence of both (1) a credit-related problem of the third party and (2) the event. The entity may be a Participating Insurer as described above, or, in other embodiments, other types of business entities, such as banks, or a person. In the case where the entity is an insurance provider (e.g., Participating Insurer 10), the insurance provider may enter into a reinsurance contract with a Reinsurer that is triggered upon the occurrence of both (1) the credit-related problem of the third party and (2) the event. The fortuitous, identifiable, insurable event may be a catastrophic event such as a hurricane, an earthquake, a fire, or a flood. In the case of a person, the fortuitous, identifiable, insurable event may be death or a health-related risk. The third party may be a government-administered catastrophe fund or some other party to which the entity is exposed to the credit risk thereof. The credit-related problem of the third party may be a solvency problem or a failure to borrow a certain amount of money on the part of the third party. The failure to borrow may arise out of a failure to obtain a loan on the part of the third party, or a failure by the third party to raise the required amount of money through the issuance of debt or equity securities.

Figure 4:
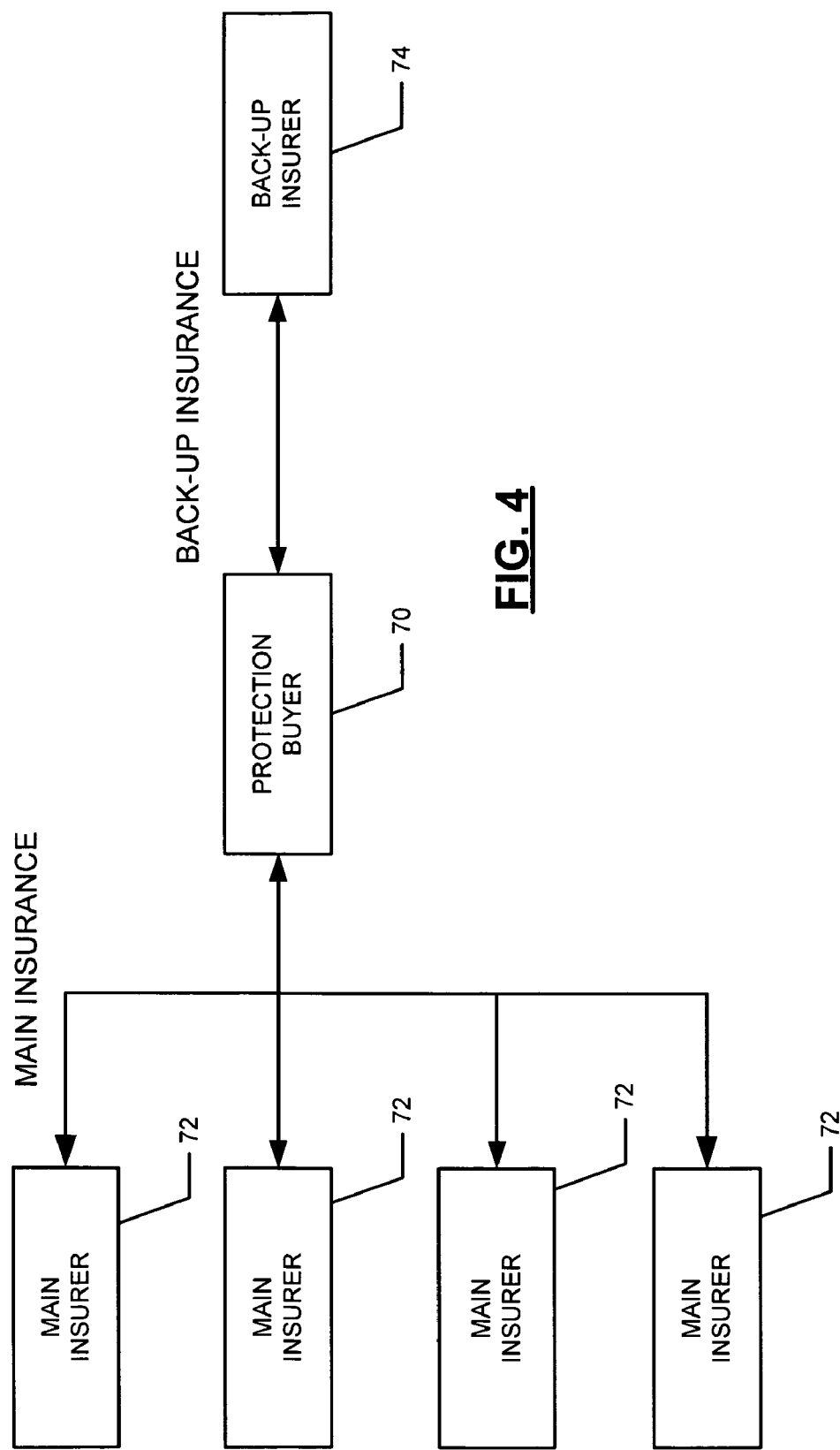
FIGS. 4 and 5 show additional embodiments of the present invention.

According to other embodiments, the present invention is directed to a process for providing event-linked credit protection to a Protection Buyer (or policyholder). With reference to FIG. 4, the process may comprise the Protection Buyer 70 procuring an insurance policy (the "Main Insurance"), from a Main Insurer 72, that covers a type of risk, such as property damage-related risks (e.g., fire, wind, earthquake, hurricane, flood, etc.), casualty, death, or health-related risks. As shown in FIG. 4, there may be one Main Insurer 72 or a portfolio of Main Insurers 72 who collectively provide the protection.

The Protection Buyer 70 also procures Back-Up Insurance from a secondary (or Back-Up) insurer 74 that has all, or substantially all, of the same terms and conditions as the Main Insurance. Hence, coverage under the Back-Up Insurance is triggered upon the same events as the Main Insurance. Additionally, the coverage limits of the Back-Up Insurance may match the coverage limits of the Main Insurance. Pursuant to the Back-Up Insurance, however, all recoveries received by the Protection Buyer 70 under the Main Insurance reduce dollar for dollar the coverage limits afforded to the Protection Buyer 70 under the Back-Up Insurance. Under the terms of the Back-Up Insurance, payment is made to the Protection Buyer 70 upon that failure of the Main Insurer 72 (if there is a single Main Insurer) or any of the Main Insurers 72 (if the Main Insurance is provided by a portfolio of Main Insurers) to pay within a specified period of time (e.g., sixty to ninety days) after the Protection Buyer 70 submits a claim to the Main Insurer(s) 72. Upon paying the claim, the Back-Up Insurer 74 may be assigned by the Protection Buyer 70 all contractual and other legal rights to recover against the non-paying Main Insurer(s) 72.

The Back-Up Insurance may qualify as reinsurance for legal, regulatory, and accounting treatment (e.g., FAS 133). According to various embodiments, the Main Insurer 72 may be a government-administered catastrophe fund, the Protection Buyer 70 may be an insurer (a Participating Insurer) that participates in the fund program, and the Back-Up Insurer 74 may be a Reinsurer that provides protection to the Participating Insurer against the credit risk of the fund, as described above.

In such an embodiment, the computer system 100 (see FIG. 6) may be used to (i) calculate the premiums owed by the Protection Buyer 70 to the Back-Up Insurer 74 and/or (ii) calculate the payment owed by the Back-Up Insurer 74 upon the failure of the Main Insurer(s) 72 to fully pay the Protection Buyer 70 within the specified period of time under the Main Insurance considering the dollar-for-dollar reduction in the amount owed by the Back-Up Insurer 74 in view of payments by the Main Insurer(s) 72.

Figure 5:
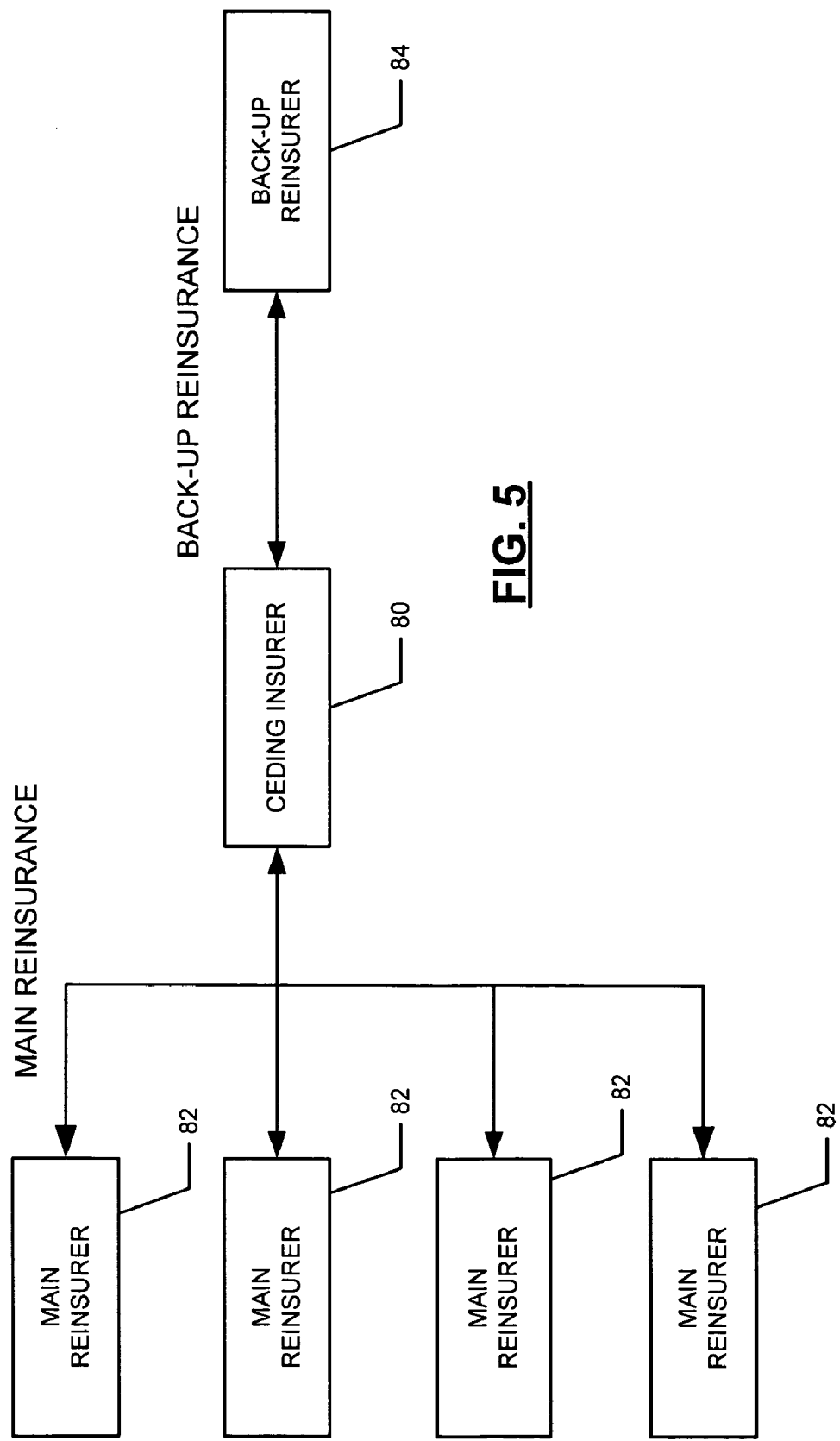

In certain embodiments, the Protection Buyer 70 may be an insurance provider, e.g., a Ceding Insurer. With reference to FIG. 5, the Ceding Insurer 80 procures a reinsurance contract (the "Main Reinsurance") with a Main Reinsurer 82. As shown in FIG. 5, there may be one Main Reinsurer 82 or a portfolio of Main Reinsurers 82 who collectively provide the reinsurance protection. The Ceding Insurer 80 also obtains a secondary reinsurance contract (the "Back-Up Reinsurance") with a Back-Up Reinsurer 84. The Back-Up Reinsurance may have all or substantially all of the same terms and conditions of the Main Reinsurance. As such, the Back-Up Reinsurance may be triggered by the same events as the Main Reinsurance, and the coverage limits of the Back-Up Reinsurance may match the coverage limits of the Main Reinsurance. Pursuant to the Back-Up Reinsurance, however, all recoveries received by the Ceding Insurer 80 under the Main Reinsurance reduce dollar for dollar the coverage limits afforded to the ceding insurer 80 under the Back-Up Reinsurance. Under the terms of the Back-Up Reinsurance, payment is made to the Ceding Insurer 80 upon that failure of the Main Reinsurer 82 (if there is a single Main Reinsurer) or any of the Main Reinsurers 82 (if the Main Reinsurance is provided by a portfolio of Main Reinsurers) to pay within a specified period of time (e.g., sixty to ninety days) after the Ceding Insurer 80 submits a claim to the Main Reinsurer(s) 82. Upon paying the claim, the Back-Up Reinsurer 84 may be assigned by the Ceding Insurer 80 all contractual and other legal rights to recover against the nonpaying Main Reinsurer(s) 82. The Back-Up Reinsurance may qualify as reinsurance for legal, regulatory, and accounting treatment (e.g., FAS 133).

In such an embodiment, the computer system 100 (see FIG. 6) may be used to (i) calculate the premiums owed by the Ceding Insurer 80 to the Back-Up Reinsurer 84 and/or (ii) calculate the payment owed by the Back-Up Reinsurer 84 upon the failure of the Main Reinsurer(s) 82 to fully pay the Ceding Insurer 80 within the specified period of time under the Main Reinsurance considering the dollar-for-dollar reduction in the amount owed by the Back-Up Reinsurer 84 in view of payments by the Main Reinsurer(s) 82.

The examples presented herein are intended to illustrate potential and specific implementations of the embodiments. It can be appreciated that the examples are intended primarily for purposes of illustration for those skilled in the art. No particular aspect of the examples is/are intended to limit the scope of the described embodiments. In addition, it is to be understood that the figures and descriptions of the embodiments have been simplified to illustrate elements that are relevant for a clear understanding of the embodiments, while eliminating, for purposes of clarity, other elements. Because the omitted elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware that may be used to implement embodiments is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent and/or semitemporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A process for providing event-linked credit protection to a protection buyer, wherein the protection buyer procured one or more primary insurance policies from one or more primary insurers to cover a defined insurable event up to a coverage limit, the process comprising:

receiving, by a secondary insurer from the protection buyer, following an occurrence of the insurable event specified in the one or more primary insurance policies, a claim for reimbursement under a secondary insurance policy between the protection buyer and the secondary insurer that covers the same event as the one or more primary insurance policies up to the same coverage limit as the one or more primary insurance policies, wherein reimbursement to the protection buyer is triggered under the secondary insurance policy upon (i) an occurrence of the event specified in the one or more primary insurance policies and (ii) a failure of by one or more of the primary insurers to make payment, because of the occurrence of the insurable event, to the protection buyer under the one or more primary insurance policies within a specified time after a qualifying claim is submitted under the one or more primary insurance policies by the protection buyer; and computing, by a computer system, an amount for the reimbursement due to the protection buyer from the secondary insurer under the secondary insurance policy, wherein all recoverables received by the protection buyer under the one or more primary insurance policies reduce, dollar for dollar, the amount of the reimbursement due the protection buyer under the secondary insurance policy;

wherein upon paying the claim for reimbursement to the protection buyer, the secondary insurer is assigned by the protection buyer rights to recover against the one or more primary insurers that failed to pay under the one or more primary insurance policies within the specified period of time following submission of the qualifying claim by the protection buyer under the one or more primary insurance policies.

2. The process of claim 1, wherein the secondary insurance policy qualifies as reinsurance for legal, regulatory, and accounting purposes.

3. The process of claim 1, wherein the defined event includes an event selected from the group consisting of an event that causes real property damage, a health-related event, or death.

4. The process of claim 1, further comprising computing, by the computer system, a premium payment amount for the secondary insurance policy to be paid by the protection buyer to the secondary insurer for the secondary insurance policy.

5. A process for providing event-linked credit protection to a ceding insurer, wherein the ceding insurer procured one or more primary reinsurance contracts from one or more primary reinsurers to cover the risk of loss on a portfolio of insurance policies of the ceding insurer due to a defined insurable event and, the process comprising:

receiving, by a secondary reinsurer from the ceding insurer, following an occurrence of the insurable event specified in the primary reinsurance contracts, a claim for reimbursement under a secondary reinsurance contract between the ceding insurer and the secondary reinsurer, wherein reimbursement under the secondary reinsurance contract is triggered upon (i) an occurrence of the insurable event specified in the portfolio of insurance policies and (ii) a failure by the one or more primary reinsurers to make payment under the one or more primary reinsurance contracts because of the occurrence of the insurable event within a specified time after a qualifying claim is submitted under the one or more primary reinsurance contracts by the ceding insurer computing, by a computer system, an amount for the reimbursement due to the ceding insurer from the secondary reinsurer under the secondary reinsurance contract, wherein all recoverables received by the ceding insurer under the one or more primary reinsurance contracts reduce, dollar for dollar, the amount of the reimbursement due to the ceding insurer under the secondary reinsurance contract;

wherein upon paying the claim, the secondary reinsurer is assigned by the ceding insurer rights to recover under the primary reinsurance contracts.

6. The process of claim 5, wherein the secondary reinsurance contract qualifies as reinsurance for legal, regulatory, and accounting purposes.

7. The process of claim 5, further comprising computing, by the computer system, a premium payment amount for the secondary reinsurance contract to be paid by the ceding insurer to the secondary reinsurer under the secondary reinsurance contract.

* * * * *